(12) United States Patent
Winters et al.

(10) Patent No.: US 7,100,011 B2
(45) Date of Patent: Aug. 29, 2006

(54) METHOD AND SYSTEM FOR REDUCING STORAGE REQUIREMENTS FOR PROGRAM CODE IN A COMMUNICATION DEVICE

(75) Inventors: Derek Winters, Duluth, GA (US); Allen Walston, Atlanta, GA (US); Jeff Andrews, Norcross, GA (US); Robert Easterling, Woodstock, GA (US); Russell Enderby, Woodstock, GA (US)

(73) Assignee: Arris International, Inc., Suwanee, GA (US)

( * ) Notice: Subject to any disclaimer, the term of this patent is extended or adjusted under 35 U.S.C. 154(b) by 232 days.

(21) Appl. No.: 10/376,381

(22) Filed: Feb. 28, 2003

(65) Prior Publication Data

US 2003/0167373 A1    Sep. 4, 2003

Related U.S. Application Data

(60) Provisional application No. 60/360,833, filed on Mar. 1, 2002.

(51) Int. Cl.
*G06F 12/02* (2006.01)
(52) U.S. Cl. ................... 711/165; 711/103; 711/105
(58) Field of Classification Search ........... 711/105, 711/103, 165
See application file for complete search history.

(56) References Cited

U.S. PATENT DOCUMENTS

| | | | | |
|---|---|---|---|---|
| 5,195,130 A | * | 3/1993 | Weiss et al. | 379/93.19 |
| 6,182,154 B1 | * | 1/2001 | Campagnoni et al. | 719/315 |
| 6,266,736 B1 | * | 7/2001 | Atkinson et al. | 711/103 |
| 6,602,201 B1 | * | 8/2003 | Hepp et al. | 600/526 |
| 2003/0070029 A1 | * | 4/2003 | Kamata et al. | 710/305 |
| 2003/0189866 A1 | * | 10/2003 | Gomm et al. | 365/200 |

\* cited by examiner

*Primary Examiner*—Matthew D. Anderson
*Assistant Examiner*—Hetul Patel
(74) *Attorney, Agent, or Firm*—John L. Doughty

(57) ABSTRACT

A software routine that writes downloaded updated operating system software over existing application code to flash memory of a cable modem in an inverted arrangement. If the download process is interrupted before the update can be verified, a pointer still points to the existing code to facilitate update-interruption recovery. After verifying a successful update, a new pointer is generated that points to the updated operating system. Then, updated application code can be downloaded and stored in the flash memory over the old operating system code.

Thus, each time an update is performed, the location of the operating system within the flash memory with respect to the location of the application code is inverted. This allows the size of flash memory to be reduced, as only one copy of the operating system and application code must be stored, while retaining capability to recovery from an incomplete download.

9 Claims, 4 Drawing Sheets

METHOD AND SYSTEM FOR REDUCING STORAGE REQUIREMENTS FOR PROGRAM CODE IN A COMMUNICATION DEVICE

CROSS REFERENCE TO RELATED APPLICATION

This application claims the benefit of priority under 35 U.S.C. 119(e) to the filing date of Winters, et al, U.S. provisional patent application No. 60/360,833 entitled "Storage-Saving Download Method For DOCSIS/PacketCable Cable Modems", which was filed Mar. 1, 2002, and is incorporated herein by reference.

FIELD OF THE INVENTION

This invention relates, generally, to communication devices and, more particularly, to reducing the storage requirements for program code software in a network interface device, such as, for example, a cable modem.

BACKGROUND

Network interface devices, such as, for example, cable modems are one way that multiple services operators ("MSO") have been meeting the demand for increased bandwidth capabilities in delivering information over networks from a central location, such as a head end, to users, such as residential and commercial end users. To facilitate such information delivery, standards have been developed that allow equipment from different manufacturers to operate, or 'talk' to one another. The predominant standard used in the cable modem industry is known as Data Over Cable Service Interface Specification, or "DOCSIS", for use in delivering digital data, such as internet information, to users over the existing coaxial lines of the Community Antenna Television system ("CATV"), which has been delivering cable television programming to users at least since the 1960's.

Currently, DOCSIS requires that when the software operating system loaded on a cable modem is remotely updated with updated software code over the network, the cable modem should be capable of recovering from an incomplete download and update procedure without the need for MSO personnel to manually update and restart the modem. In such a scenario, an MSO will typically change a software load's filename in the configuration file that is downloaded from the head end to the cable modem when the modem ranges and registers (range and register are terms known in the art). The cable modems then individually request new software corresponding to the updated filename from the head end.

It will be appreciated that this process is used in the DOCSIS systems, but other applications may use a broadcast download routine. In addition, another method used for downloading updated software code to a cable modem in a DOCSIS system is known in the art as Simple Network Managment Protocol ("SNMP"). SNMP allows the MSO to set various parameters on a cable modem remotely. Thus, an MSO can set the new filename of a new software load on a cable modem and instruct the cable modem to download same. Thus, personnel of the MSO need not physically visit a MSO subscriber's premises to upgrade, update or otherwise modify a given cable modem's operating system or other application software. An example of other application software that may be implemented by a cable modem includes PacketCable software for facilitating voice telephony over the cable modem system.

The specifications for DOCSIS, as well as PacketCable, require that a cable modem be able to recover from an unsuccessful download and update procedure, which may be caused by a power loss during downloading and updating of code. If the code is only partially downloaded and updated when a power loss occurs, then the partial code could render the modem inoperable.

To overcome the potential inability to reboot a cable modem after loss of code that may occur when the power loss occurs, cable modems are typically engineered to accommodate two copies of the code. Each copy includes the operating system code as well as applications code. Thus, if a given code is interrupted during download, the modem is not rendered inoperable because the second copy of the code, as it existed before the download process was begun, can be used to reboot the cable modem after power has been restored. Upon boot-up, the code is typically loaded from a flash memory device into random access memory ("RAM"). If the operating system sought by the system upon boot-up has been corrupted, then the system looks to the second copy, or 'backup.' Although this 'dual banking' scheme provides adequate protection against an incomplete or corrupt download of updated software, a drawback is that twice the amount of flash memory space is required to store two separate and complete sets of code in a compressed format, each set comprising both operating and applications code. Since the cost of the flash memory used in cable modems is not insignificant, the overall cost is increased for a cable modem designed to use the dual banking scheme as compared with a modem that does not need to store two separate and identical copies of code. In addition, since two copies must be maintained, the size of either the DOCSIS operating system code portion, as well as whatever applications software may be stored is limited. For example, a typical software load in a cable modem may include the DOCSIS portion using 1.2 megabytes ("MB") and the applications portion comprising 1.0 MB. While these are just examples, they illustrate typical load sizes for the DOCSIS operating system and application code, such as, for example, PacketCable, respectively.

Since flash memory typically is typically manufactured having storage capacity sizes that are powers of two, a 4 MB flash memory chip could not store two copies of software used in the dual banking scheme. Thus, an 8 MB flash memory device is typically used to accommodate the two software load copies. By inefficiently using the flash memory capacity in a dual banking system (only 4.4 MB plus one boot loader sector and two non-volatile memory ("NVM") sectors—may be used for instruction pointers and factory information—are used, leaving approximately 3 MB unused), cost are typically higher Thus, there is a need for a method and system for downloading code from a Cable Modem Termination System ("CMTS") head end to a cable modem that preserves the invulnerability of the modem against an incomplete download of updated software, which could result in the inability to reboot the modem. Furthermore, there is a need for a method and system for downloading and updating such program code that facilitates an increase in the size of software code that can be stored while at the same time reducing the cost of the modem.

SUMMARY

It is an object to provide a method for downloading updated software from a head end to a cable modem that overwrites in flash memory an existing application code portion with updated operating system code without overwriting existing operating system code until the updated code has been verified as error-free. It will be appreciated that 'operating system code', as used herein, refers to essential code, which includes not only operating system software, but other core code for operating the cable modem in a DOCSIS-compliant manner. Thus, the phrases 'operating system code' and 'essential code' are used interchangeably herein. Typically, as long as half, or less, of the available flash memory is used for the operating system, then the updated operating system can be downloaded without damage to the existing operating system load. If the updating operation is interrupted, due to a power failure, for example, then the cable modem reboots using the existing operating system.

In such a scenario, download to the cable modem's RAM of the operating system code and application code portions—both code portions are typically downloaded together—is performed again, because whatever is stored in RAM is lost upon a loss of power. Then, updating from RAM to flash memory of the updated operating system is attempted again. When the operating system has been loaded to flash memory, the updated software is verified, using a CRC check, for example, to ensure that it was not corrupted during the download process. Then, after the updated download has been verified, the older version of the operating system (the version used to boot the current session and the version that is 'existing'while the updated version is being downloaded) is overwritten by an updated version of application code. Even if a newer version of the application code has not been created for distribution by an MSO, the current application software version will be loaded from RAM, as the application code existing at the time the update process was begun would have been erased and overwritten by the updated operating system software load.

Accordingly, with each new software load, the updated operating system is alternatingly written to either a first memory area, or a second memory area, depending on where the existing operating system is written, so as not to overwrite the existing operating system code until the writing of the updated existing operating system code has been verified. The first area begins at the address immediately after the location of the boot and NVM sectors and ends at the sector that immediately precedes the second area, where whichever code portion that was not written to the first area begins.

This writing of the updated operating system data into the flash memory in such an alternating fashion is referred to as inverted software loading. This is because with every other update process, the relationship of the essential to the non-essential code within the flash memory device is inverted, as compared with a 'normal' load orientation, in which the operating system is stored beginning at a lower address than the application code. It will be appreciated that there are not two physically fixed areas that exist in flash memory for the two types of code, essential and non-essential. Rather, the concept of first and second areas is merely used to illustrate and describe the locational relationship of the essential code to the nonessential code, as stored at any given time in the flash memory device.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise to exclude any such other embodiments, adaptations, variations, modifications and equivalent arrangements, the present invention being limited only by the claims appended hereto and the equivalents thereof.

Turning now to the figures, as discussed above, FIG. 1 illustrates a flash memory arrangement used in a traditional dual-banking-flash-memory scheme 2. The flash memory arrangement 2 is divided into a plurality of sectors, as know to those skilled in the art, including a boot sector 4, an NVM sector 6 and a backup NVM 8. The remaining section 10 comprises sectors for storing executable code, such as an operating system code portion and an application code portion.

Figures 1, 2, 3:
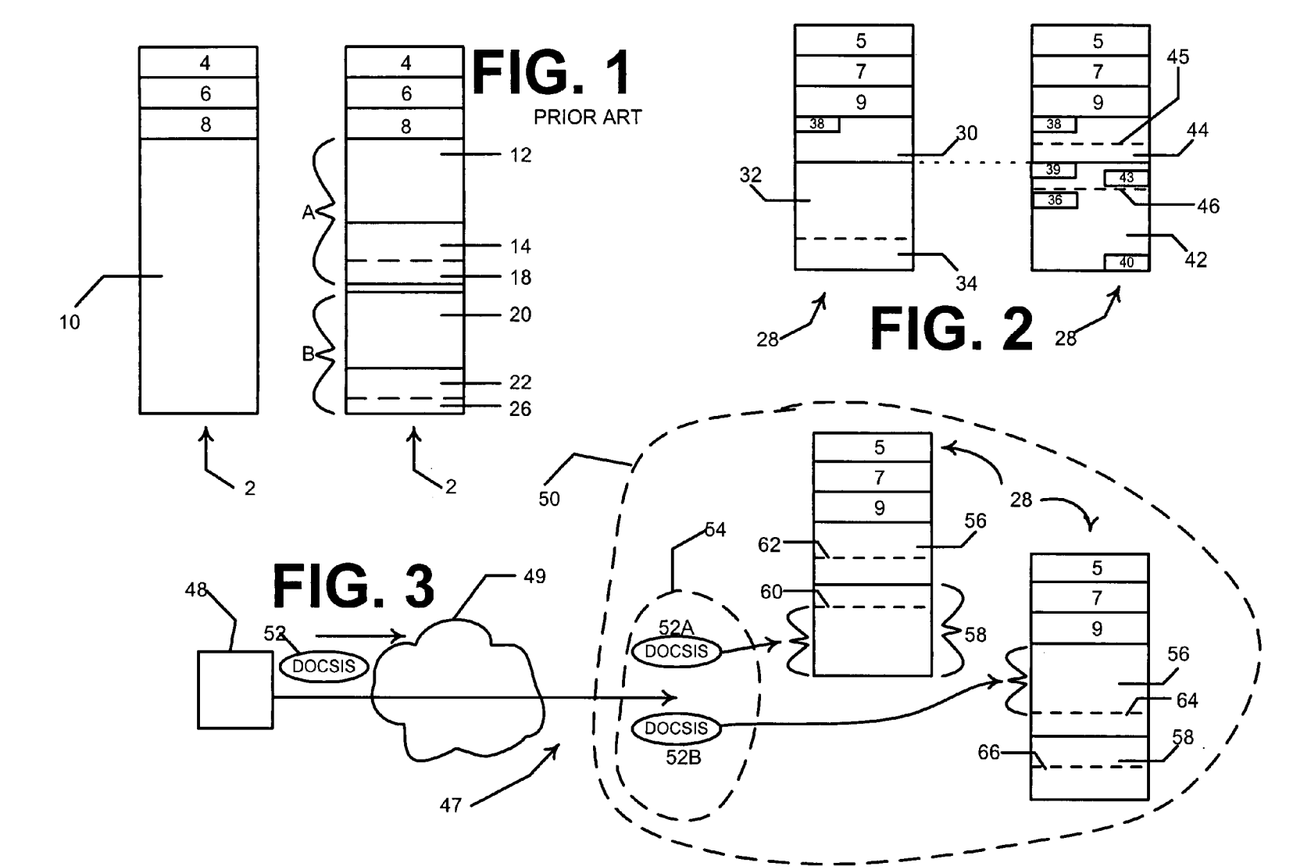
FIG. 1 illustrates a flash memory arrangement used in a traditional dual banking flash memory scheme.
FIG. 2 illustrates the alternating memory allocation arrangement used in an alternatingly inverting software load system.
FIG. 3 illustrates the temporal-to-memory-area-arrangement relationship of cable modem software stored in an inverting software load system.

In the dual banking scheme, executable code section 10 is typically split into two section, 10A and 10B. During normal operation, each section is a copy of the other. When updated code is downloaded from the head end, the update always is written to the same section, either 10A or 10B. If, for example, updates are always loaded to section 10A first, then section 10B would remain unaltered until the updated load in A can be verified as having been copied error-free. Thus, if an error occurs while downloading to section 10A, then an error-free copy remains in section 10B. When the modem attempts to reboot after a power failure, the modem would default to loading the operating system from section 10A. If, however, it is determined that the code in section 10B is corrupt, then the modem automatically seeks the operating system from section 10B, thereby allowing boot up, after which, download of the updated code is attempted again.

Upon successful load, the modem verifies that the code was properly transferred to memory 2, by performing error checking routines, such as, for example, a CRC or a bit-by-bit check routine, both of which are known in the art. Upon verification that the code was loaded properly and error free to section 10A, the updated code is copied from section 10A to section 10B.

In FIG. 1, section 10A is shown broken into the operating system portion 12 and the application code portion 14, with section 18 representing unused sectors of a first copy of the software load. Sections 20, 22 and 26 represent the duplicates in section 10B of the operating system portion, the applications code portion, and the unused sector associated with the second copy of the software load. Thus, under normal operating conditions, the data in sections 10A are duplicates of and correspond to the data in section 10B, and vice versa. It will be appreciated that in the traditional dual banking scheme, operating system and application code portions are not separated, and are thus typically downloaded as an undivided portion of code.

It will be appreciated that during a software update operation, either entire section 10A or 10B, including the operating system portion and the application portion, as well as the unused sectors, is written to flash memory 2. Thus, if the entire operating system portion has been downloaded to section 10A, but the applications portion is only partially downloaded when the download operation is interrupted, then the download is unsuccessful. Accordingly, upon reboot, the cable modem may first seek an operating system in section 10A, and after discovering that a uncorrupted operating system does not exist in section 10A, the boot code contained within sector 4 will seek an operating system in section 10B, where the version that existed before the download operation was begun should reside.

Turning now to FIG. 2, the memory allocation of a smaller flash memory device 28 is shown. In addition to the boot loader sector 5, NVM sector 7 and backup NVM sector 9, space is available for storage of one operating system code portion 30 and one application code portion 32, shown loaded in a 'normal' arrangement in the left view in the figure. Depending on the locational relationship of the operating system portion 30 to the application system portion 32 from a previous download, the location of the operating system portion versus the location of the application code portion may be inverted with respect to the order of the same code portions in a previous download. For purpose of discussion, the operating system code being loaded above the non-essential application code, as shown in left view in the figure, is referred to as the 'normal' arrangement and a relationship that has the application code above the operating system code is referred to as an 'inverted' load, as shown in the right view.

For example, in the flash memory stack 28 illustrated in the leftmost view of FIG. 2, the operating system portion 30 immediately follows the backup NVM sector 9, followed by the application code portion 32 and unused space 34. When the flash memory is loaded with existing code in the normal mode as shown in the leftmost view of FIG. 2, an update operation will begin writing an updated operating system code into the flash memory at the end of the memory stack 28. Thus, as shown in the right view, the first byte of the updated operating system code will begin at location 36 instead of location 38, which is the beginning byte of the existing operating system code when the download begins in the illustrated example. As long as the updated operating system code does not require more space than is available between byte 39 and the end of space byte ("EOS") 40 that marks the end of the last sector of stack 28, the updated operating system may be written to the flash memory stack. When the updated operating system code has been written, two versions of the operating system will exist in the stack 28, the operating system 30 beginning at byte 38 that existed before the update process began, and the updated system 42 beginning at byte 36.

It will be appreciated that before the updated software 42 is written to stack 28, some sectors containing the existing application code may be erased to allow the writing of the update. After the updated operating system 42 has been written and verified, there will be no application code stored in the flash memory stack 28, other than what may remain between bytes 39 and 43. Thus, the cable modem will automatically begin to load from RAM an updated application code 44 into a section of flash memory shown between dashed lines 45 and 46, the first sector of which has a starting byte between, and possibly including, byte 38, and byte 43. When this has occurred, software is loaded in the flash memory stack 28 in an inverted orientation, as shown in the rightmost view of FIG. 2 compared to the orientation in the leftmost view. If there is any unused space following the update procedure, it will lie between byte 38 and dashed line 45.

Turning now to FIG. 3, a system 47 is shown for downloading software from a head end 48 through a network 49, such as, for example, a CATV network, to a cable modem 50. The operating system code 52 is downloaded from head end 48 through network 49 and stored in RAM 54 at cable modem 50. The figure is used to illustrate two different download sessions, A and B.

During session A, DOCSIS operating system code 52A, along with application code, is received by cable modem 50 and stored in RAM 54. In the example, the currently stored, also referred to as the existing, operating system code resides in partition 56 of flash memory device 28A. The available space in partition 58, in which the existing application code resides, is determined. Partition 58 is where the updated DOCSIS operating system code 52A will be written to avoid overwriting of the code stored in partition 56. It will be appreciated that when the updated operating system code, or essential code, has been written, the last byte of the operating system code will be stored in the last sector of stack 28. Thus, the beginning bytes of the existing application code may, or may not, be overwritten, and may remain in the space between the end of the previously existing essential code stored in partition 56 and the beginning of the updated essential code written into partition 58. This is shown as the space between the solid line of demarcation between partitions 56 and 58, as they existed before the update session, and dashed line 60 that indicates the beginning sector of the updated operating system code.

Then, after DOCSIS code 52A has been written to partition 58 and verified, updated application code can be stored into partition 56, the ending byte of the updated application code being stored into the sector immediately preceding the sector bounded by dashed line 60. Thus, in visually looking at the depiction of stack 28, after download session A, the application code resides in the bounded by dashed lines 60 and 62, and the essential DOCSIS operating system code resides in the lower part of the original partition 58 between dashed line 60 and the end of the stack. The load is now in an inverted orientation During a next download session, which will be referred to as session B, the new updated operating system code 52B will be downloaded and stored to RAM 54 as during session A, along with updated application code. Then, the available space in stack 28 is analyzed to determine whether the new updated operating system code 52B can be stored in the stack without overwriting the current operating system code, which was the updated operating system code during session A, and which resides in partition 58. When it is determined that adequate space exists in stack 28, the new updated DOCSIS operating system code 52B is written from RAM to the upper part of partition 56, the end of which is indicated by dashed line 64.

Then, similar to the process as described in connection with session A, the process of verification, updating and writing of application code over the existing operating system code is performed. Following these steps, the essential operating system code 52B is stored between the end of the backup NVM sector 9 and dashed line 64. Immediately located thereafter is the application code, which ends as indicated by dashed line 66. Thus, following session B, the orientation of the operating system code portion relative to the application code portion is inverted with respect to the orientation of the same code portions following session A, and is now in the 'normal' orientation. Unused space lies between dashed line 66 and the end of stack 28.

Thus, during either of sessions A or B, updated operating system code is downloaded into a flash memory device containing an existing version of the operating code, the flash device being smaller than the flash memory device typically used heretofore in a conventional cable modem system that follows the DOCSIS standard. It will be appreciated that typically at least half of the space in the stack not used by the boot sector or NVM sectors (these three sectors may be collectively referred to herein as dedicated space) is available for download of updated operating system code. This is based on the assumption that in general, updated code is typically as large or larger, in terms of bytes, than the existing code that it is to replace. Thus, if a queued update to the operating system was larger than half of the undedicated space, then it should not be written. This may be true, even if the existing operating system code is less that half of the undedicated space, because the next time an update is attempted, the new update would probably be just as big or bigger. However, this general rule can be overridden if the update is smaller than the existing code it is to replace. This discussion of the size of the operating system code section relative to adequate size in the writable area of the flash memory device illustrates that as long as the size of the updated operating system code will not result in overwriting of the existing operating system when the update is written to flash memory, then the update algorithm will work.

Figure 4:
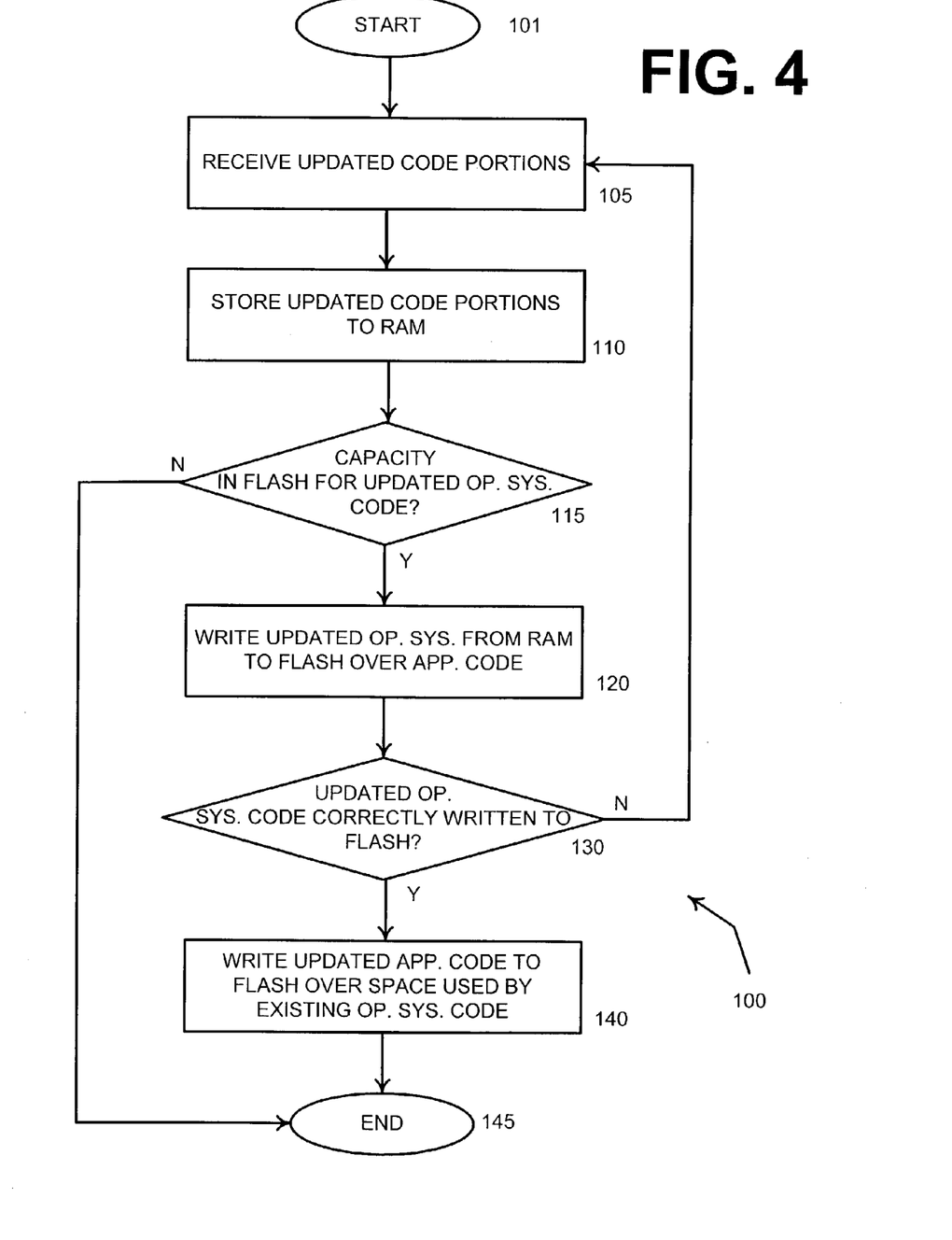
FIG. 4 shows a flow chart illustrating the steps in remotely loading software in an inverting software load scheme system.

Turning now to FIG. 4, the algorithm 100 of updating a software load using an inverted load method is illustrated beginning at step 101. At step 105, an operating system code portion and an application code portion, which have been split apart from one another but are downloaded simultaneously and which include headers containing markers indicating the respective sizes thereof, are received at a cable modem. The download is received in response to a request for updated software, or as a result of an automatic downstream sending of the code from a head end. When the updated code portions have been received at the modem, the code is stored into RAM memory at step 110.

Next, the flash memory is analyzed to determine whether enough non-dedicated space less the space used for the existing operating system is available to store a compressed version of the received operating system code update at step 115. The size of the code to be written is determined based on information contained in headers included within each code portion update. Accordingly, each of the application and operating system codes portions contain size information, among other data, in the header. It will be appreciated that the terms compressed and uncompressed are used to indicate that executable code (including the operating system as well as application code) is stored in flash memory in a compressed format, but is uncompressed when loaded into RAM for execution. However, when updated code is received from the head end, it is typically already compressed, and is typically stored into RAM in this compressed format before the update procedure begins.

The writable capacity is typically determined applying absolute value and subtraction operations to the starting addresses of the existing operating system code and the existing application code to determine the difference between the two starting addresses. If the existing operating system begins at a lower address than the application code, as in the 'normal' orientation arrangement discussed earlier, the result is then subtracted from the total non-dedicated memory. If the starting address of the application code is lower, as in the 'inverted' orientation, i.e., closer to the boot loader and NVM dedicated sectors, than that of the operating system, then the difference can be compared directly with the size of the operating system code update, the size of which is typically given in a header thereof. If adequate space is not determined to exist, the process ends.

If, however, there is adequate space, the updated operating system that is waiting in RAM is written to the flash memory over the space that was previously occupied by existing application code at step 120. It will be appreciated that this step of writing, as well as other writing steps of the updated operating system code process 100, typically follows a step of erasing the sectors of the stack that is to be written.

Following the writing process, the updated operating system code is checked at step 130 by an error checking routine, such as a CRC routine known in the art. If the error check does not indicate that a valid copy of the operating system code has been written, the routine returns to step 105, with the cable modem requesting that the head end resend the updated operating system code. Following verification of a successful download and update, in each of the NVM sectors of the dedicated sectors following the boot loader sector, a pointer that points to the starting address of the operating system is updated to point to the updated operating system. Thus, if a power outage occurs before the verification step is performed, at reboot, the modem boot loader will reload the old operating system that was in existence before the updated was attempted, and request that the updated code be downloaded again from the head end. If a valid copy of the updated operating system code is verified, any time thereafter at boot up the cable modem will load the updated operating system into RAM based on the updated address pointer.

Upon verification that the written operating system update is a valid copy of the code that was sent by the head end, updated application code is written (after the available space has been erased) to flash memory into the available space at step 140 and pointers pointing to the application code are updated similar to the process of updating the operating system code pointers. It will be appreciated that a substantial amount of this space will typically comprise space where the operating system resided before the update was written at step 120. Accordingly, the orientation of the application code location with respect to the location of the operating system alternates as compared to the orientation of these code portions that existed before the update process 100 was performed. The process ends at step 145.

Figure 5:
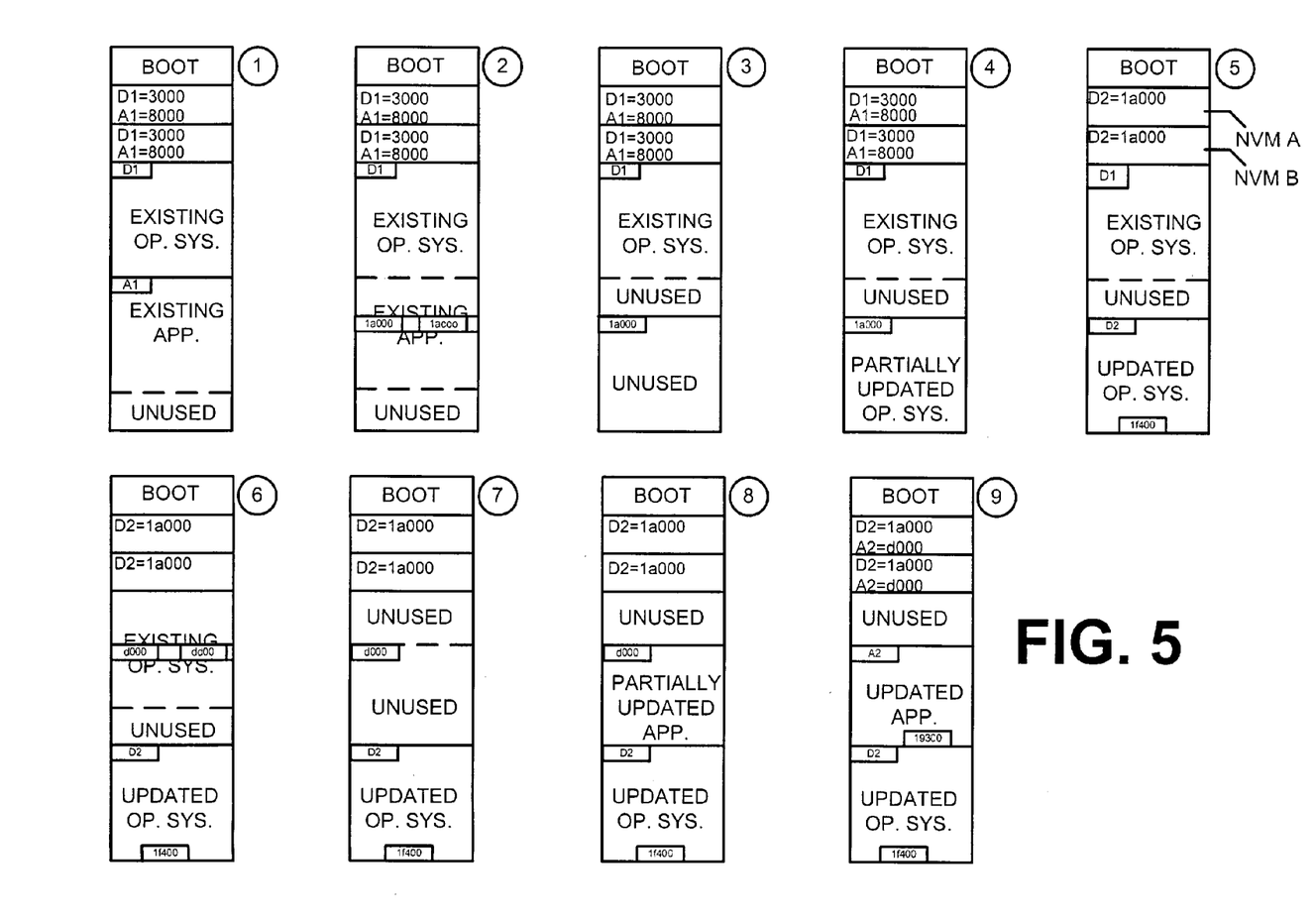
FIG. 5 shows the sequential memory allocation in a flash memory stack that begins with a normal software load and ends with an inverted load.

Turning now to FIG. 5, the memory allocation in the non-volatile flash memory stack is shown as the steps of the process described in reference to FIG. 4 are carried out. At time 1, the stack is shown as it is configured in the normal mode before an update process begins. It will be appreciated that the space below the dashed lines represents unused space, and the boot sector and the two sectors below the boot sector collectively compose the dedicated sectors. The pointer D1 points to the beginning byte address of the first sector where the existing operating system is stored and pointer A1 points to the beginning byte of the first sector where the existing application code.

In the example shown in FIG. 5, the cable modem stack is shown in the "normal" orientation. The flash memory stack begins with a DOCSIS operating system image that starts at 0×3000. It is assumed for this example that the size of the load is 0×5000 bytes, with the operating system image being stored from 0×3000 to 0×7fff, and the application image beginning at 0×8000 and ending at 0×12000, which would mean, for this example, that it has a size of 0×a000 bytes.

In the example, the updated image sizes are 0×5400 bytes for the operating system and 0×c300 bytes for the application. The download routine extracts this information from the headers of the downloaded file and then begins calculating where to store the new load. The modem knows it needs 0×5400 bytes for the operating system image and it knows the flash memory device ends at 0×20000 bytes. Accordingly, the two numbers are subtracted yielding 0×1ac00. From the flash driver it is determined that 0×1a000 is the start of the sector containing byte 0×1ac00, as shown in time 2. The routine checks to ensure that writing anything to 0×1a000 will not overwrite any of the existing operating system code. Thus, since no such overwriting will occur, the routine erases at time 3 and then writes at time 4 the new essential operating system code image from byte 0×1a000 to byte 0×1f400.

After the operating system code has been stored and then verified in flash, the routine erases and then writes updated information to the sections of the dedicated NVM areas containing the load pointers at time 5. A pointer is written pointing to the updated operating system code and a blank pointer is written relative to the application image in NVM A. Once NVM A is written, the same information will be written to NVM B. At this point in time, both NVM sectors contain pointers to the new operating system image, but no pointer to an application image.

Next, the algorithm calculates the space needed for the application image. Since the operating system image starts at 0×1a000 and the application image requires 0×c300 bytes, these numbers are subtracted, yielding 0×dd00. At time 6, the flash driver is queried to determine the beginning address of the sector containing 0×dd00, which, in the example, is 0×d000. After the space to be written is erased at step 7, the new application image is written from bytes 0×d000 to 0×19300 at time 8.

After the application code has been written at time 8, the updated application pointers are written at time 8 to the NVM areas containing the load pointers. First, the new application pointer is written to NVM A. After NVM A is written and verified, the same information is written to NVM B. At this point, both NVM sectors contain pointers to both the new essential operating system code and the new application code. The modem then resets itself and reboots with the new load.

It will be appreciated that when the steps of erasing flash memory before updated code is written thereto at times 3 and 7 is performed, the number of sectors erased is typically only the number needed for writing an update. Thus, although the portions of flash memory indicated at times 3 and 7 as 'unused' may potentially be erased, typically only the portions beginning at 1a000 in time 3 and the portion between (and including) d000 and 1a000 (not including) in time 7 are erased. However, if all the space labeled as 'unused' in the figure were needed, then those sectors would be available for the writing of updated code thereto.

Figure 6:
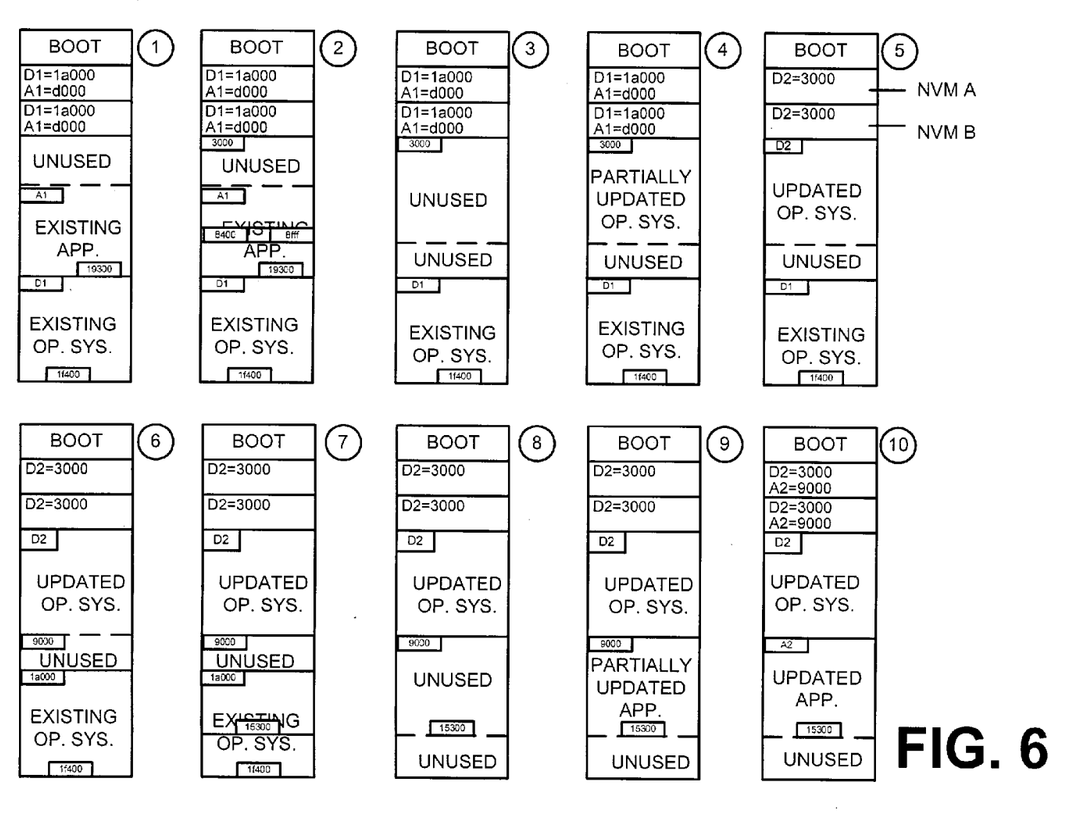
FIG. 6 shows the sequential memory allocation in a flash memory stack that begins with an inverted software load and ends with a normal software load.

Turning now to FIG. 6, a second example is illustrated showing how software is loaded when the initial condition is the inverted load arrangement. The flash memory stack currently has an existing operating system image that, for purposes of example, has a size of 0×5400 bytes and, from the example illustrated in relation to FIG. 5, is stored from 0×1a000 to 0×1f400. The existing application image is stored from 0×d000 to 0×19300 (0×c300 bytes big). These initial conditions are shown at time 1.

For the present example, it is assumed that the modem will download a new image operating system size of 0×5400 bytes and application size of 0×c300 bytes. After this updated code has been received and temporarily stored in RAM, the update algorithm looks up this information in the headers of the file(s) stored in RAM and begins calculating where to store the new load. It is known that 0×5400 bytes is needed for the operating system code and that the code storage area starts at 0×3000 bytes. Thus, these two numbers are added yielding 0×8fff. The flash driver is then queried at time 2 to determine that the end location of the sector containing 0×8400 is 0×8fff. A check is performed to ensure that erasing/writing anything through 0×8fff will not overwrite any of the old DOCSIS operating system code, since erasing a flash sector eliminates data in the whole sector. After erasing the area in the stack used for the existing application code through 0×8fff at time 3, the new DOCSIS image is written from byte address 0×3000 through 0×8400 at time 4.

After the updated operating system code has been stored in flash memory and verified, updated information is written to the load pointer sections of the NVM sectors at time 5. The process at time 5 comprises writing a pointer that points to the updated DOCSIS image and a blank pointer for the application image in NVM A. Once NVM A is written, the information therein is copied to NVM B. Accordingly, at this point, both NVM sectors contain pointers to the new DOCSIS image and no pointer to an application image.

Next, the space needed for the application image is calculated at time 6. Since the DOCSIS image ends at 0×8400, the beginning of the next available sector is calculated. Based on the flash drivers, the starting address of the next available sector is determined to be 0×9000 at time 6. The algorithm adds 0×9000 to the application image size of 0×c300 bytes, with the result of 0×15300 being shown in the section between 0×9000 and the end of flash memory at time 7. At time 8, the space needed for storing the updated application code is erased, and at time 9, the updated application image is stored and verified from 0×9000 through 0×15300.

At time 10, new information is written to the NVM areas containing the load pointers that point to the application code. The updated application code pointer is added to NVM A. After NVM A is written and verified, the application pointer address information is stored to NVM B. At this point, both NVM sectors contain pointers to both the updated DOCSIS operating system and the updated application images. The modem then resets itself and reboots with the new load.

It will be appreciated that in this example an updated DOCSIS operating system image does not always completely overwrite the existing application image. However, such overwriting is a possible and anticipated scenario. As long as the existing DOCSIS operating system image is not overwritten by the updated DOCSIS operating system image, the algorithm will have accomplished its goal. In addition, the preferred embodiment utilizes smart flash drivers that can handle multiple types of flash devices with varying sector sizes and are known in the art. Sector sizes can vary without the design being fixed to a specific sector size. As long as the underlying flash drivers can handle varying flash sizes, scalability is possible. Furthermore, the NVM location in flash being at the beginning is designed for purposes of simplicity. As long as the algorithm has access to the beginning and end of one contiguous storage space, flash memory devices that are configured with NVM at the end of flash can be used.

It will also be appreciated that, although the above-described preferred embodiment describes a first download area as starting immediately after the boot and NVM sectors when going from the inverted to normal storage arrangement, or as being flush against the bottom of the stack when going from the normal to the inverted arrangement, this is but an example, but not the only way of performing the process of storing updated data. As long as an adequately large contiguous storage area exists for receiving updated code, there are multiple ways the algorithm can be implemented, i.e., the code portions may be fragmented, for example, and sectors storing code of one type (essential or non-essential) may be separated by sectors storing data from the other code type.

Regarding the boot loader, once the cable modem has been initialized by the boot loader, NVM A is queried for valid load pointers, pointing to both DOCSIS operating system and application code portions. If the pointers are within an acceptable range then the boot loader tries to verify that the loads pointed to are valid. First, a header within the DOCSIS operating system image is analyzed for information before a CRC check is performed on the code. If the CRC returns acceptable results, the operating system code is decompressed and loaded into RAM. Once the image is decompressed and loaded, another CRC is performed on the decompressed RAM image to make sure it decompressed correctly. If the DOCSIS image in RAM was decompressed and loaded satisfactorily, an attempt is made to decompress the application image following the same method. Regardless of the success of the decompressing and loading of the application code image, the boot loader will then attempt to execute the DOCSIS image. When the operating system software is executed, results of the application code decompression attempt are passed to the operating system code via, for example, a data bit, flag, variable, or other means for passing data to software known to those skilled in the art, for later recovery use if necessary.

This data bit/variable is also used in the runtime checks whenever calls are made by the operating system to application code, to determine whether or not valid application code exists in the modem. If valid code cannot be found (based on the data bit/variable), then an attempt at executing the application code is not made. If this check were not performed, the cable modem processor could continually attempt to execute application code that either does not exist, or is random code that would continually cause processor error and reset. Thus, calls to application code from the DOCSIS operating system are limited, and each call is protected with a runtime check.

If the DOCSIS image called from NVM A failed to decompress, then the boot loader will check NVM B for valid pointers. If NVM B has valid pointers, the previously discussed decompression techniques are performed on the code pointed to by these pointers. If the DOCSIS image from NVM B decompresses satisfactorily, this decompressed image will then be executed and the results of a following attempt at decompressing the application code pointed to by the pointer NVM B will be passed to the operating system by the boot loader. When the DOCSIS software is running, the cable modem will attempt to range and register with the CMTS. Once a configuration file is downloaded from the head end as part of the ranging and registering process, the data bit/variable result of the application code decompression attempt that was passed by the boot loader will be analyzed. If the attempted application decompression failed, a trivial file transfer protocol ("TFTP") transfer will be requested from the head end server corresponding to the current load. If the newly downloaded updated DOCSIS image is the same as the DOCSIS image stored in flash memory, the cable modem operating system will skip updating of the DOCSIS image again and will proceed to store the updated application image to the appropriate position in flash memory, as discussed above. Once the new application image is verified in flash, the cable modem operating system will store updated NVM pointers, indicate that a successful download/update process has been completed, and will then reboot itself.

To facilitate recovery from an incomplete or corrupted download/update procedure, the cable modem typically ranges and registers with the CMTS, after which other steps typically occur. The cable modem will check its configuration file received from the CMTS head end provisioning server to determine whether an updated software load is specified, in which case an update process will begin. The modem also checks the status of the existing software load. If corruption of the existing software load is detected, then the download/update process will begin. If a new software load is specified in the configuration file, a TFTP transfer of that file will be requested. If an updated application load is not specified in the configuration file, then the process of downloading the last attempted filename will begin. Then, the new file is transferred using TFTP to RAM.

The boot loader facilitates two recovery scenarios. The first scenario is where the download/update process was interrupted before the new DOCSIS load was fully programmed to flash and the old application load was corrupted. The second scenario is where the download/update was interrupted after the new DOCSIS image was successfully updated, but before the new application image was successfully updated.

In the first recovery scenario, the cable modem is currently running its old/existing DOCSIS load. Accordingly, the download and updating process will begin as described above in reference to the figures. In the second scenario, it will be detected that the DOCSIS image in flash is a byte-for-byte match to the DOCSIS image in RAM, and updating of the DOCSIS image will be skipped. Accordingly, the updated application image will be stored to the appropriate location relative to the already-stored updated DOCSIS image. Then, the NVM pointers are updated after a successful update procedure, and the cable modem is rebooted.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What is claimed is:

1. A method for updating the software load of a network communication device with updated software code received from a head end and stored into RAM memory of the communication device comprising:
   determining whether sufficient storage capacity exists within a flash memory device for storing updated essential code thereto while maintaining existing essential code therein, the flash memory device having stored therein one copy of the existing essential code and one copy of existing non-essential code;
   writing the updated essential code from the RAM device to the flash device such that the existing essential code is not overwritten by the updated essential code;
   verifying that the updated essential code has been written to the flash memory device without error;
   writing updated non-essential application code to the flash memory device beginning at an address where the previously existing essential code begins; and
   wherein the flash device has enough capacity to store one copy of essential code and one copy of non-essential code, but not enough capacity to store two copies of essential code and two copies of non-essential code.

2. The method of claim 1 wherein the nonessential application code includes code for operating a telephony device.

3. The method of claim 2 wherein the nonessential application code includes PacketCable code.

4. The method of claim 1 wherein a pointer D1 and a pointer A1, which are stored in a first NVM pointer sector and a second NVM pointer sector, each NVM pointer sector a duplicate of the other, point in the flash memory device to the addresses of the existing essential code and the existing non-essential code, respectively, further comprising:
   storing a pointer D2, which points in the flash memory device to the beginning address of the updated essential code, to the first NVM pointer sector after said updated essential code has been written to the flash memory device;
   storing a pointer A2, which points in the flash memory device to the beginning address of the updated non-essential code, to the first NVM pointer sector after said updated non-essential code has been written to the flash memory device; and
   copying the pointers from the first NVM pointer sector to the second NVM pointer sector.

5. The method of claim 4 further comprising:
   erasing the existing non-essential code portion before writing the updated essential code there over;
   erasing D1 and A1 from the first NVM pointer sector before storing D2 and A2 thereto; and
   erasing the existing essential code after verifying that the updated essential code was written without error, but before writing the updated non-essential code.

6. The method of claim 1 further including using a runtime check algorithm to limit the number of times the operating system essential code attempts to call the non-essential code.

7. The method of claim 1 further comprising the step of booting the communication device from the existing essential code following a loss of power to the communication device that occurred during the process of updating the software load, but before the step of verifying that the updated essential code has been written to the flash memory device without error has been performed.

8. The method of claim 7 wherein upon reboot, the communication device requests of the head end that the updated software code be re-sent and stored to RAM, after which the steps of claim 1 are performed.

9. The method of claim 1 further comprising verifying that the updated non-essential code has been written to the flash memory device without error.

* * * * *